United States Patent
Wu et al.

(10) Patent No.: US 10,172,160 B2
(45) Date of Patent: Jan. 1, 2019

(54) CHANNEL CONTENTION METHOD, ACCESS POINT, AND STATION

(71) Applicant: HUAWEI TECHNOLOGIES CO., LTD., Shenzhen, Guangdong (CN)

(72) Inventors: Tianyu Wu, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 15/220,155

(22) Filed: Jul. 26, 2016

(65) Prior Publication Data
US 2016/0338105 A1 Nov. 17, 2016

Related U.S. Application Data

(63) Continuation of application No. PCT/CN2014/071561, filed on Jan. 27, 2014.

(51) Int. Cl.
*H04W 84/12* (2009.01)
*H04W 74/08* (2009.01)
(Continued)

(52) U.S. Cl.
CPC ...... *H04W 74/0816* (2013.01); *H04W 72/121* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,078,568 A | 6/2000 | Wright et al. |
| 8,953,498 B2 | 2/2015 | Kim |

(Continued)

FOREIGN PATENT DOCUMENTS

| CN | 1882932 A | 12/2006 |
| CN | 101394225 A | 3/2009 |

(Continued)

OTHER PUBLICATIONS

Wang et al., "A Method for Data Transmission Protection on the IEEE 802.11ac MU-MIMO Downlink," Powerpoint, 11-11-0410-01-00ac-a-method-for-data-transmission-protection-on-the-ieee-802-11ac-mu-mimo-downlink, (Mar. 16, 2011).

(Continued)

*Primary Examiner* — Ayanah S George
(74) *Attorney, Agent, or Firm* — Leydig, Voit & Mayer, Ltd.

(57) ABSTRACT

The present disclosure discloses a channel contention method, an access point, and a station. The method includes: sending, by an AP, an RTS frame, where the RTS frame carries group response indication information, and the group response indication information is used to instruct multiple STAs to return CTS frames; receiving, by the AP, a CTS frame that is returned according to the group response indication information by a STA among the multiple STAs that receives the RTS frame; and determining, by the AP according to the received CTS frame, that a transmission opportunity is obtained. According to the channel contention method, the access point, and the station in the embodiments of the present disclosure, data transmission between an AP and multiple STAs can be effectively protected with a relatively small overhead, and system efficiency can be improved.

16 Claims, 4 Drawing Sheets

(51) Int. Cl.
*H04W 72/12* (2009.01)
*H04W 88/08* (2009.01)

(56) References Cited

U.S. PATENT DOCUMENTS

| | | | |
|---|---|---|---|
| 8,989,066 B2 * | 3/2015 | Merlin | H04W 28/26 370/310 |
| 9,854,449 B2 | 12/2017 | Wu | |
| 2004/0204105 A1 | 10/2004 | Liang et al. | |
| 2005/0165946 A1 | 7/2005 | Stephens | |
| 2005/0169177 A1 | 8/2005 | Park et al. | |
| 2005/0243843 A1 * | 11/2005 | Imamura | H04W 16/14 370/401 |
| 2008/0112351 A1 | 5/2008 | Surineni et al. | |
| 2010/0046491 A1 | 2/2010 | Vermani et al. | |
| 2011/0261708 A1 * | 10/2011 | Grandhi | H04W 4/06 370/252 |
| 2012/0082200 A1 * | 4/2012 | Verikoukis | H04L 1/0026 375/227 |
| 2012/0087316 A1 | 4/2012 | Merlin et al. | |
| 2012/0327915 A1 | 12/2012 | Kang et al. | |
| 2015/0236766 A1 | 8/2015 | Papadopoulos et al. | |
| 2016/0128097 A1 | 5/2016 | Pajukoski et al. | |
| 2016/0277166 A1 | 9/2016 | Liu | |
| 2016/0323776 A1 | 11/2016 | Wu | |
| 2016/0330631 A1 | 11/2016 | Wu | |
| 2016/0338085 A1 | 11/2016 | Wu | |
| 2016/0338105 A1 | 11/2016 | Wu | |
| 2017/0127451 A1 | 5/2017 | Chun et al. | |

FOREIGN PATENT DOCUMENTS

| | | |
|---|---|---|
| CN | 101808385 A | 8/2010 |
| CN | 102014393 A | 4/2011 |
| CN | 102098091 A | 6/2011 |
| CN | 102119515 A | 7/2011 |
| CN | 102547917 A | 7/2012 |
| CN | 102577207 A | 7/2012 |
| CN | 102792757 A | 11/2012 |
| JP | 2013526153 A | 6/2013 |
| JP | 2013528015 A | 7/2013 |
| KR | 20110056298 A | 5/2011 |
| KR | 20130007643 A | 1/2013 |
| RU | 2426273 C2 | 8/2011 |
| WO | 2005119478 A1 | 12/2005 |
| WO | 2011123631 A1 | 10/2011 |

OTHER PUBLICATIONS

XP68036006A, Haiguang Wang et al. :a method for data transmission protection on the IEEE802.11ac mu-mimo downlink; 11-11-0410-02-00a. IEEE802.11-11/0410R2. Mar. 16, 2011. total 14 pages.
IEEE Std 802.11™—2012, IEEE Standard for Information technology—Telecommunications and information exchange between systems Local and metropolitan area networks—specific requirements Part 11: Wireless LAN Medium Access Control (MAC) and Physical Layer (PHY) Specifications. Mar. 29, 2012. total 2793 pages.
Stacey et al., "Proposed TGac Draft Amendment," IEEE 802.11-101/361r0, pp. 1-130, Institute of Electrical and Electronics Engineers, New York, New York (Nov. 2010).

* cited by examiner

CHANNEL CONTENTION METHOD, ACCESS POINT, AND STATION

CROSS-REFERENCE TO RELATED APPLICATIONS

This application is a continuation of International Patent Application No. PCT/CN2014/071561, filed on Jan. 27, 2014, which is hereby incorporated by reference in its entirety.

TECHNICAL FIELD

The present disclosure relates to the communications field, and in particular, to a channel contention method, an access point, and a station.

BACKGROUND

A wireless local area network (WLAN) system works in an unlicensed spectrum, and users may share the spectrum on a channel. If multiple users send data at the same time may cause a collision that may interfere with each other. Therefore, in the WLAN system, a carrier sense multiple access with collision avoidance (CSMA/CA) mechanism is used to avoid a collision. In an existing WLAN system, data packets contend, in a CSMA/CA mechanism, for sending. Carrier sense (CS) indicates that before sending a frame, any device connected to a medium needs to sense the medium, and only when it is determined that the medium is idle, the device can send the frame. Multiple Access (MA) indicates that multiple devices may access a medium at the same time, and a frame sent by one device may also be received by multiple devices. According to the CSMA/CA mechanism, an active collision avoiding manner rather than a passive sensing manner is used to resolve a collision problem, which can meet a requirement imposed when it is difficult to accurately sense whether a collision occurs. A working manner of the CSMA/CA mechanism is that when a device intends to send a frame and obtains by means of sensing that a channel is idle, after the channel remains idle for a time period, if the channel is still idle after the device waits for another random time period, the device submits data. Because a waiting time of each device is generated randomly, it is likely that there is a difference, so that a possibility of collision can be reduced. A probability of occurrence of a collision is related to how busy a system is. In the WLAN system, there is a hidden node problem, that is, when an access point (AP) such as AP1 sends data to a station (STA), and that station fails to sense the AP1. In this example another AP, AP2, may consider that a channel is idle and start to send data, thereby interfering with a receiving device STA. This problem cannot be resolved by using the CSMA/CA protocol.

Because of the hidden node problem, in the WLAN system, the request to send/clear to send (RTS/CTS) protocol is generally used to perform transmission protection. This protocol actually is that: a channel is reserved first before data is sent. When the AP1 sends data to the STA, the AP2 may also perform sending, thereby interfering with receiving of the STA. The RTS/CTS protocol defines that, before sending data, the AP1 first sends an RTS frame, and the STA returns a CTS frame after receiving the RTS frame. All APs or STAs receiving the RTS or CTS frame set a network allocation vector (NAV) according to an indication of the received RTS or CTS frame, where the NAV is a time corresponding to a sending time required by the AP1. These APs or STAs cannot send data within the NAV time. After sending an RTS frame and receiving a response of the STA, the AP1 obtains a sending opportunity, and the AP1 sends data to the STA within this time period, which is not interfered with by an AP or STA nearby.

In some cases, an AP may need to acquire a transmission opportunity of a time period, so as to exchange data with multiple STAs. In this time period, the AP may need to send data to the multiple STAs, and may also receive data from the multiple STAs.

The existing RTS/CTS protocol is applicable to only protection of data transmission between an AP and one STA. To protect transmission between an AP and multiple STAs, the AP may send an RTS frame to each of the multiple STAs sequentially, and the STAs sequentially return a CTS frame. However, this requires multiple groups of RTS/CTS interactions, which greatly increases an extra overhead of a system and reduces system efficiency.

SUMMARY

Embodiments of the present disclosure provide a channel contention method, an access point, and a station, which can effectively protect data transmission between an AP and multiple STAs.

According to a first embodiment, a channel contention method is provided, where the method includes sending, by an access point AP, a request to send RTS frame, where the RTS frame carries group response indication information, and the group response indication information is used to instruct multiple stations STAs to return clear to send CTS frames. This embodiment also includes receiving, by the AP, a CTS frame that is returned according to the group response indication information by a STA among the multiple STAs that receives the RTS frame, and determining, by the AP according to the received CTS frame, that a transmission opportunity is obtained.

With reference to the first embodiment, in a first possible implementation manner, the multiple STAs belong to a group in a basic service set BSS of the AP and the group response indication information is a group identifier.

With reference to the first embodiment or the foregoing possible implementation manner of the first embodiment, in a second possible implementation manner, the multiple STAs are all STAs in a BSS of the AP, and the group response indication information is a Media Access Control MAC address of the AP or a preset value.

With reference to the first embodiment or either of the foregoing possible implementation manners of the first embodiment, in a third possible implementation manner, the group response indication information is carried in a receiver address RA field of the RTS frame.

With reference to the first embodiment or any one of the foregoing possible implementation manners of the first embodiment, in a fourth possible implementation manner, the method further includes When the AP is associated with a new STA, if a MAC address of the new STA is the same as the group response indication information, updating, by the AP, the group response indication information, and sending updated group response indication information to all the STAs in the BSS.

With reference to the first embodiment or any one of the foregoing possible implementation manners of the first embodiment, in a fifth possible implementation manner, CTS frames returned by the STAs returning the CTS frames are the same.

With reference to the first embodiment or any one of the foregoing possible implementation manners of the first embodiment, in a sixth possible implementation manner, before the sending, by an access point AP, a request to send RTS frame, the method further includes allocating, by the AP, an identifier sequence to each STA in the BSS of the AP, where the identifier sequences of the STAs are orthogonal or quasi-orthogonal; and after the receiving, by the AP, a CTS frame that is returned according to the group response indication information by a STA among the multiple STAs that receives the RTS frame. This method further includes receiving, by the AP, an identifier sequence that is sent after the STA returning the CTS frame returns the CTS frame and performing, by the AP, a correlation operation according to the received identifier sequence and the identifier sequences of the multiple STAs, to determine the STA returning the CTS frame.

According to a second embodiment, a channel contention method is provided, where the method includes receiving, by a station STA, a request to send RTS frame sent by an access point AP, where the RTS frame carries group response indication information, and the group response indication information is used to instruct multiple STAs to return clear to send CTS frames and returning, by the STA, a CTS frame to the AP according to the group response indication information.

With reference to the second embodiment, in a first possible implementation manner, the multiple STAs belong to a group in a basic service set BSS of the AP; and the group response indication information is a group identifier. The returning, by the STA, a CTS frame to the AP according to the group response indication information includes determining, by the STA according to the group identifier, that the STA belongs to the group, and returning the CTS frame to the AP.

With reference to the second embodiment or the foregoing possible implementation manner of the second embodiment, in a second possible implementation manner, the multiple STAs are all STAs in a BSS of the AP and the group response indication information is a Media Access Control MAC address of the AP or a preset value.

With reference to the second embodiment or either of the foregoing possible implementation manners of the second embodiment, in a third possible implementation manner, the group response indication information is carried in a receiver address RA field of the RTS frame.

With reference to the second embodiment or any one of the foregoing possible implementation manners of the second embodiment, in a fourth possible implementation manner, the method further includes receiving updated group response indication information sent by the AP, where the updated group response indication information is obtained after the AP updates the group response indication information when the AP is associated with a new STA and if a MAC address of the new STA is the same as the group response indication information.

With reference to the second embodiment or any one of the foregoing possible implementation manners of the second embodiment, in a fifth possible implementation manner, the CTS frame returned by the STA is the same as another CTS frame that is returned according to the group response indication information.

With reference to the second embodiment or any one of the foregoing possible implementation manners of the second embodiment, in a sixth possible implementation manner, before the receiving, by a station STA, a request to send RTS frame sent by an access point AP, the method further includes acquiring, by the STA, an identifier sequence allocated by the AP, where the identifier sequence of the STA is orthogonal or quasi-orthogonal to an identifier sequence allocated by the AP to another STA in the BSS of the AP and after the returning, by the STA, a CTS frame to the AP according to the group response indication information, the method further includes sending, by the STA, the identifier sequence of the STA to the AP, so that the AP determines, according to the received identifier sequence, the STA returning the CTS frame.

According to a third embodiment, an access point AP is provided, where the AP includes a sending module, configured to send a request to send RTS frame, where the RTS frame carries group response indication information, and the group response indication information is used to instruct multiple stations STAs to return clear to send CTS frames, a receiving module, configured to receive a CTS frame that is returned according to the group response indication information by a STA among the multiple STAs that receives the RTS frame, and a determining module, configured to determine, according to the received CTS frame, that a transmission opportunity is obtained.

With reference to the third embodiment, in a first possible implementation manner, the multiple STAs belong to a group in a basic service set BSS of the AP and the group response indication information is a group identifier.

With reference to the third embodiment or the foregoing possible implementation manner of the third embodiment, in a second possible implementation manner, the multiple STAs are all STAs in a BSS of the AP and the group response indication information is a Media Access Control MAC address of the AP or a preset value.

With reference to the third embodiment or either of the foregoing possible implementation manners of the third embodiment, in a third possible implementation manner, the group response indication information is carried in a receiver address RA field of the RTS frame.

With reference to the third embodiment or any one of the foregoing possible implementation manners of the third embodiment, in a fourth possible implementation manner, the AP further includes an updating module, configured to: when the AP is associated with a new STA, if a MAC address of the new STA is the same as the group response indication information, update the group response indication information where the sending module is further configured to send updated group response indication information to all the STAs in the BSS.

With reference to the third embodiment or any one of the foregoing possible implementation manners of the third embodiment, in a fifth possible implementation manner, CTS frames returned by the STAs returning the CTS frames are the same.

With reference to the third embodiment or any one of the foregoing possible implementation manners of the third embodiment, in a sixth possible implementation manner, the AP further includes an allocating module, configured to allocate an identifier sequence to each STA in the BSS of the AP, where the identifier sequences of the STAs are orthogonal or quasi-orthogonal. The receiving module is further configured to receive an identifier sequence that is sent after the STA returning the CTS frame returns the CTS frame and the determining module is further configured to perform a correlation operation according to the received identifier sequence and the identifier sequences of the multiple STAs, to determine the STA returning the CTS frame.

According to a fourth embodiment, a station STA is provided, where the STA includes a receiving module, configured to receive a request to send RTS frame sent by an access point AP, where the RTS frame carries group response indication information, and the group response indication information is used to instruct multiple STAs to return clear to send CTS frames and a sending module, configured to return a CTS frame to the AP according to the group response indication information.

With reference to the fourth embodiment, in a first possible implementation manner, the multiple STAs belong to a group in a basic service set BSS of the AP and the group response indication information is a group identifier. In this embodiment the STA further includes a determining module, configured to determine, according to the group identifier, that the STA belongs to the group where the sending module is specifically configured to: when the determining module determines that the STA belongs to the group, return the CTS frame to the AP.

With reference to the fourth embodiment or the foregoing possible implementation manner of the fourth embodiment, in a second possible implementation manner, the multiple STAs are all STAs in a BSS of the AP and the group response indication information is a Media Access Control MAC address of the AP or a preset value.

With reference to the fourth embodiment or either of the foregoing possible implementation manners of the fourth embodiment, in a third possible implementation manner, the group response indication information is carried in a receiver address RA field of the RTS frame.

With reference to the fourth embodiment or any one of the foregoing possible implementation manners of the fourth embodiment, in a fourth possible implementation manner, the receiving module is further configured to receive updated group response indication information sent by the AP, where the updated group response indication information is obtained after the AP updates the group response indication information when the AP is associated with a new STA and if a MAC address of the new STA is the same as the group response indication information.

With reference to the fourth embodiment or any one of the foregoing possible implementation manners of the fourth embodiment, in a fifth possible implementation manner, the CTS frame returned by the STA is the same as another CTS frame that is returned according to the group response indication information.

With reference to the fourth embodiment or any one of the foregoing possible implementation manners of the fourth embodiment, in a sixth possible implementation manner, the receiving module is further configured to: before receiving the request to send RTS frame sent by the access point AP, receive an identifier sequence allocated by the AP, where the identifier sequence of the STA is orthogonal or quasi-orthogonal to an identifier sequence allocated by the AP to another STA in the BSS of the AP and the sending module is further configured to: after returning the CTS frame to the AP according to the group response indication information, send the identifier sequence of the STA to the AP, so that the AP determines, according to the received identifier sequence, the STA returning the CTS frame.

Based on the foregoing technical solutions, according to the embodiments of the present disclosure, an RTS frame carrying group response indication information is sent, to instruct multiple STAs to return CTS frames, and a CTS frame that is returned according to the group response indication information is received, so that data transmission between an AP and multiple STAs can be effectively protected with a relatively small overhead, and system efficiency can be improved.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
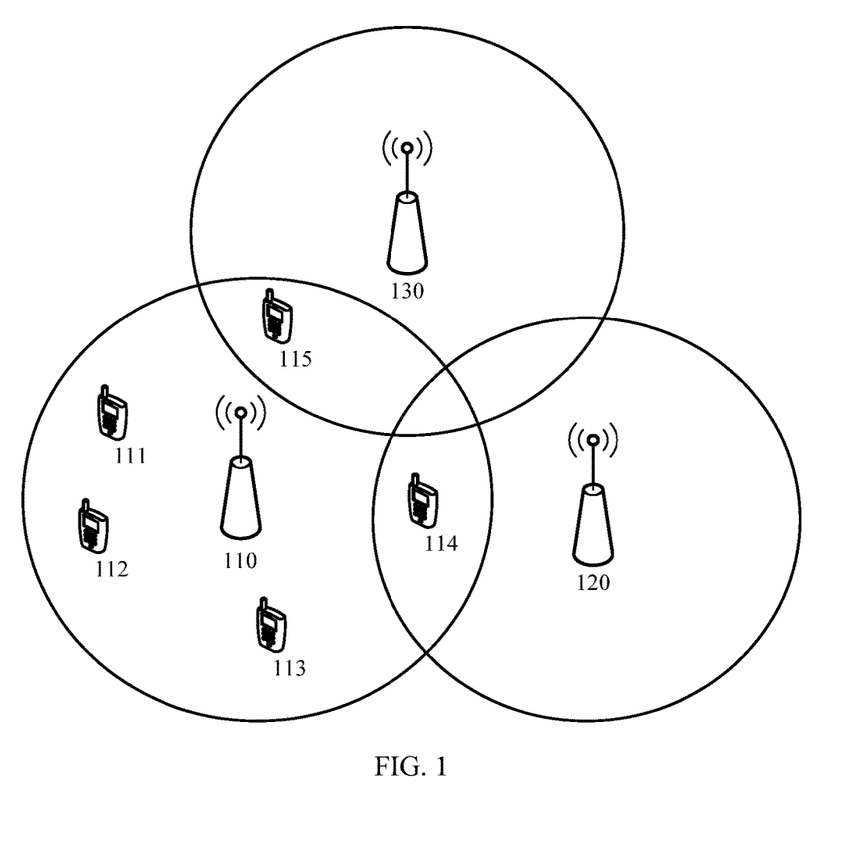
FIG. 1 is a diagram of an application scenario according to an embodiment of the present disclosure.

FIG. 1 is a diagram of a scenario to which the embodiments of the present disclosure may be applied. As shown in FIG. 1, multiple STAs (STA 111 to STA 115) are located within coverage of an AP 110, and the AP 110 and the multiple STAs form a basic service set (BSS), where some STAs may be located within coverage of another AP at the same time, for example, the STA 114 is also located within coverage of an AP 120, and the STA 115 is also located within coverage of an AP 130. When the AP 110 needs to perform data transmission with multiple STAs, for example, perform scheduling transmission, downlink (downlink, DL)/uplink (uplink, UL) multi-user multiple-input multiple-output (Multi-User Multiple-Input Multiple-Output, MU MIMO) transmission, or orthogonal frequency division multiple access (Orthogonal Frequency Division Multiple Access, OFDMA) transmission with the multiple STAs, the AP 110 needs a transmission opportunity to protect transmission between the AP 110 and the multiple STAs.

Figure 2:
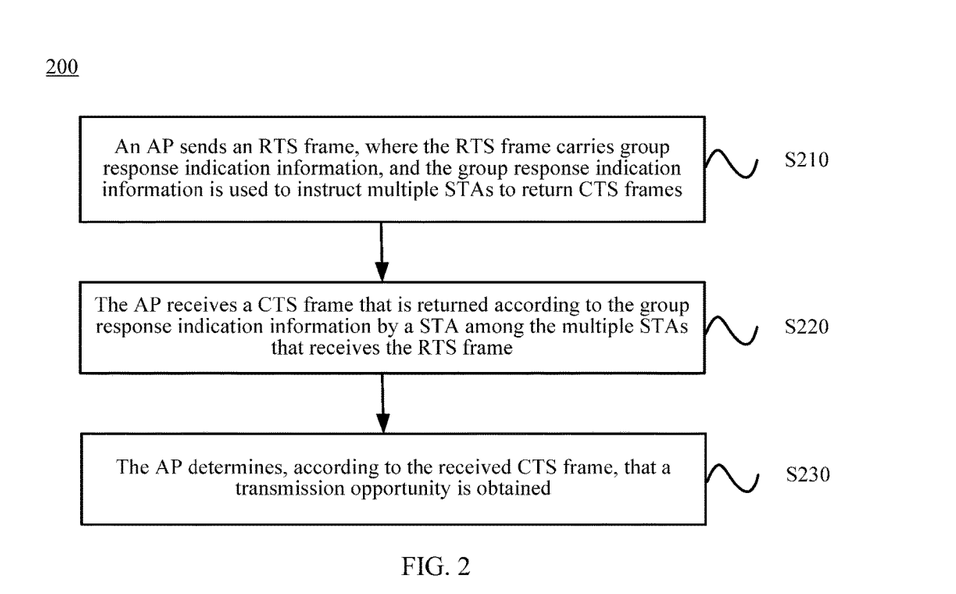
FIG. 2 is a schematic flowchart of a channel contention method according to an embodiment of the present disclosure.

FIG. 2 is a schematic flowchart of a channel contention method 200 according to an embodiment of the present disclosure. As shown in FIG. 2, the method 200 includes block S210: An AP sends an RTS frame, where the RTS frame carries group response indication information, and the group response indication information is used to instruct multiple STAs to return CTS frames. In block S220 the AP receives a CTS frame that is returned according to the group response indication information by a STA among the multiple STAs that receives the RTS frame. In block S230 the AP determines, according to the received CTS frame, that a transmission opportunity is obtained.

In this embodiment of the present disclosure, the execution body AP of the method 200 may be the AP 110 shown in FIG. 1, and in this case, the multiple STAs may be all or some of the STA 111 to the STA 115 shown in FIG. 1.

When the AP needs to communicate with the multiple STAs, the AP needs to obtain a transmission opportunity. In this embodiment of the present disclosure, the AP sends an RTS frame carrying group response indication information, where the group response indication information is used to instruct the multiple STAs to return CTS frames. That is, the multiple STAs are all target STAs and all need to return CTS frames. After the AP sends the RTS frame, when receiving the RTS frame, a node (a STA or another AP) within coverage of the AP determines, according to the group response indication information, whether the node is a target STA, that is, determines whether the node is a STA among the multiple STAs; and if the node is not a target STA, sets an NAV according to the RTS frame; or if the node is a target STA, returns a CTS frame. In this way, after receiving the RTS frame, the multiple STAs are instructed by the group response indication information to return, according to the group response indication information, CTS frames to the AP. After each STA returning a CTS frame sends the CTS frame, when a node within coverage of the STA receives the CTS frame, if the node is not the AP, an NAV is set according to the CTS frame, and in this way, the node causes no interference to the STA. After receiving the CTS frame that is returned according to the group response indication information, the AP successfully obtains a transmission opportunity, so that the AP can communicate with the multiple STAs by using the transmission opportunity. Because a difference between times at which STAs within coverage of a same AP receive an RTS frame is slight, the STAs return CTS frames almost at the same time. As long as a difference between times at which the CTS frames, sent by the STAs, arrive at the AP is within a time length range of a cyclic prefix (Cyclic Prefix, CP), the AP can receive the CTS frames correctly. That is, in this embodiment of the present disclosure, as long as an AP sends only one RTS frame and receives only one CTS frame, the AP can obtain an opportunity to perform data transmission with multiple STAs, thereby implementing protection for data transmission between the AP and the multiple STAs with a relatively small overhead. With the transmission opportunity, the AP is also allowed to communicate with a STA that does not return a CTS frame. Because of lack of protection by the CTS frame, a possibility that transmission between the AP and the multiple STAs succeeds may decrease.

According to the channel contention method in this embodiment of the present disclosure, an RTS frame carrying group response indication information is sent, to instruct multiple STAs to return CTS frames, and a CTS frame that is returned according to the group response indication information is received, so that data transmission between an AP and multiple STAs can be effectively protected with a relatively small overhead, and system efficiency can be improved.

In this embodiment of the present disclosure, the multiple STAs are multiple STAs with which the AP needs to perform data transmission, and may be all STAs within coverage of the AP, or may be a group of STAs. The AP instructs, by using the group response indication information to carry the CTS frame, the multiple STAs to return CTS frames.

Optionally, in an embodiment of the present disclosure, the multiple STAs belong to a group in a BSS of the AP, and in this case, the group response indication information is a group identifier.

When the AP needs to communicate with a group of STAs, the AP uses the sent RTS frame to carry a group identifier, to instruct a STA in the group to return a CTS frame.

For example, in FIG. 1, the STA 113, the STA 114, and the STA 115 belong to a group. When the AP 110 intends to perform data transmission with the group of STAs, the AP 110 uses an RTS frame to carry a group identifier. In this case, after receiving the RTS frame, the STA 111 and the STA 112 that do not belong to the group determine, according to the group identifier, that they do not belong to the group, and then, set an NAV; and the STA 113, the STA 114, and the STA 115 that belong to the group determine, according to the group identifier, that they belong to the group, and then, return CTS frames to the AP 110. The AP 120 that is beyond coverage of the AP 110 and is within coverage of the STA 114 can receive the CTS frame sent by the STA 114, and then, sets an NAV, so as to cause no interference to data transmission of the STA 114. Similarly, the AP 130 that is beyond the coverage of the AP 110 and is within coverage of the STA 115 can receive the CTS frame sent by the STA 115, and then, sets an NAV, so as to cause no interference to data transmission of the STA 115.

In this embodiment, the AP and the STAs prestore grouping information of the STAs. The AP finds, according to the grouping information, that a group identifier is carried in an RTS frame; and when receiving the RTS frame, each STA determines, according to whether a group identifier of a group to which each STA belongs is the same as the group identifier carried in the RTS frame, whether a CTS frame needs to be returned.

Optionally, in another embodiment of the present disclosure, the multiple STAs are all STAs in a BSS of the AP, and in this case, the group response indication information is a Media Access Control (Media Access Control, MAC) address of the AP or a preset value.

When the AP needs to communicate with all the STAs in the BSS, the AP uses the sent RTS frame to carry identification information of the BSS, for example, the identification information may be a MAC address of the AP or a preset value. When the preset value is used, the preset value may be any specific value that does not conflict with MAC addresses of all the STAs in the BSS. The preset value needs to be notified to all the STAs in the BSS in advance.

For example, in FIG. 1, when the AP 110 intends to perform data transmission with all the STAs in the BSS, the AP 110 sends an RTS frame, where the RTS frame carries a MAC address of the AP 110 or a preset value. When receiving the RTS frame, each of the STA 111 to the STA 115 determines, according to the MAC address or the preset value, that a CTS frame needs to be returned, and then, returns the CTS frame to the AP 110. In this way, the AP 120 that is beyond coverage of the AP 110 and is within coverage of the STA 114 can receive the CTS frame sent by the STA 114, and then, sets an NAV, so as to cause no interference to data transmission of the STA 114. Similarly, the AP 130 that is beyond the coverage of the AP 110 and is within coverage of the STA 115 can receive the CTS frame sent by the STA 115, and then, sets an NAV, so as to cause no interference to data transmission of the STA 115.

In this embodiment of the present disclosure, the group response indication information can be carried in a receiver address (Receiver Address, RA) field of the RTS frame.

Figure 3:
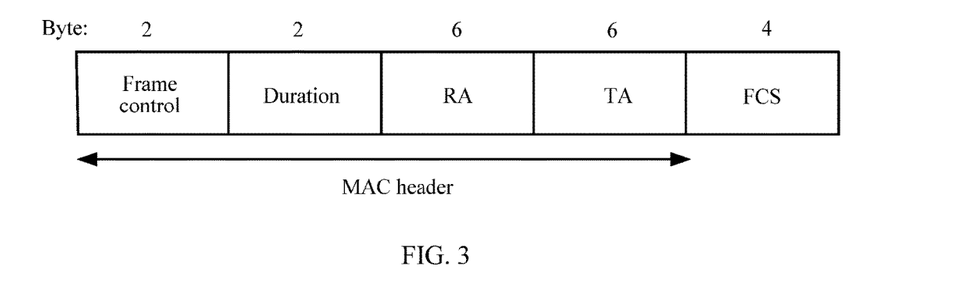
FIG. 3 is a schematic diagram of a frame structure of an RTS frame.

FIG. 3 is a schematic diagram of a frame structure of an RTS frame. The RA field is defined as a receiver address. In this embodiment, the RA field in the RTS frame is used to carry the group response indication information.

When the group response indication information is a group identifier, the group identifier is carried in the RA field, that is, a receiver address is defined as the group identifier. In this case, an address in the RA field is a multicast address, and the RTS frame sent by the AP is a multicast RTS frame. The STA determines, according to the multicast address, whether the STA is a target STA and whether to return a CTS frame.

When the group response indication information is the MAC address of the AP or the preset value, the MAC address of the AP or the preset value is carried in the RA field, that is, a receiver address is defined as the MAC address of the AP or the preset value. In this case, an address in the RA field is a broadcast address, and the RTS frame sent by the AP is a broadcast RTS frame. The STA determines, according to the broadcast address, whether the STA is a target STA and whether to return a CTS frame.

The group response indication information is carried in the RA field, so that a slight modification is made to an existing RTS frame, and backward compatibility can be maintained.

It should be understood that, the group response indication information may also be carried in another field of the RTS frame, which is not limited in this embodiment of the present disclosure. No matter the group response indication information is carried in which field, the STA can determine, according to the group response indication information, whether to return a CTS frame. These implementation manners shall fall within the protection scope of the present disclosure.

In this embodiment of the present disclosure, optionally, the method 200 further include when the AP is associated with a new STA, if a MAC address of the new STA is the same as the group response indication information, updating, by the AP, the group response indication information, and sending updated group response indication information to all the STAs in the BSS.

For example, if a group identifier or a preset value is used as the group response indication information, when a new STA in the BSS is associated with the AP, the AP needs to check whether a MAC address of the STA conflicts with a currently defined group identifier or preset value. If there is a conflict, the AP needs to update the group identifier or the preset value and sends an updated value to all the STAs in the BSS, for example, the AP notifies all the STAs in the BSS of a change in the group identifier or the preset value by using a broadcast frame or a beacon (Beacon) frame.

In this embodiment of the present disclosure, CTS frames returned by the STAs returning the CTS frames are the same. That is, CTS physical frames sent by the STAs have completely same content, use completely same preambles (preamble), and are sent by using a completely same modulation and coding scheme, so as to ensure that the AP correctly receives the CTS frames.

After receiving CTS frames that are returned according to the group response indication information by the multiple STAs, the AP determines that a transmission opportunity is obtained, and then, the AP performs data transmission with the multiple STAs by using the transmission opportunity.

Among all STAs that should return CTS frames, there may be a STA that does not receive the RTS frame sent by the AP. In this case, STAs actually returning CTS frames are fewer than all the STAs that should return CTS frames. Optionally, the AP may further determine which STAs have returned CTS frames.

Optionally, in this embodiment of the present disclosure, before the AP sends the RTS frame, the method 200 further includes allocating, by the AP, an identifier sequence to each STA in the BSS of the AP, where the identifier sequences of the STAs are orthogonal or quasi-orthogonal; and after the AP receives the CTS frame that is returned according to the group response indication information by the STA among the multiple STAs that receives the RTS frame. This embodiment further includes receiving, by the AP, an identifier sequence that is sent after the STA returning the CTS frame returns the CTS frame and performing, by the AP, a correlation operation according to the received identifier sequence and the identifier sequences of the multiple STAs, to determine the STA returning the CTS frame.

That is, the AP allocates the identifier sequence to each STA in advance, and the identifier sequences of the STAs are orthogonal or quasi-orthogonal; after returning a CTS frame, each STA sends the identifier sequence; and the AP performs a correlation operation on the received identifier sequence and identifier sequences of all the STAs that should return CTS frames, so as to determine a STA actually returning a CTS frame.

According to the channel contention method in this embodiment of the present disclosure, multiple STAs are instructed in an RTS frame to return CTS frames, so that data transmission between an AP and multiple STAs can be effectively protected with a relatively small overhead, and system efficiency can be improved.

The foregoing describes the channel contention method in the embodiments of the present disclosure in detail from a perspective of an AP, and the following describes the channel contention method in the embodiments of the present disclosure in detail from a perspective of a STA.

Figure 4:
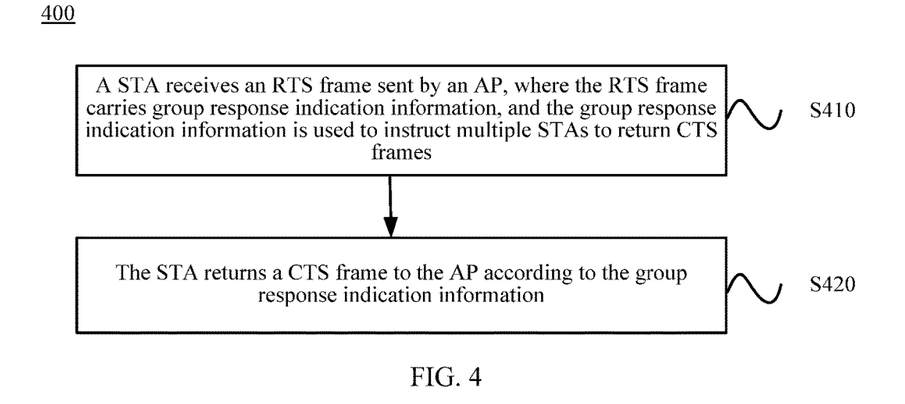
FIG. 4 is a schematic flowchart of a channel contention method according to another embodiment of the present disclosure.

FIG. 4 is a schematic flowchart of a channel contention method 400 according to another embodiment of the present disclosure. As shown in FIG. 4, the method 400 includes:

S410: A STA receives an RTS frame sent by an AP, where the RTS frame carries group response indication information, and the group response indication information is used to instruct multiple STAs to return CTS frames.

S420: The STA returns a CTS frame to the AP according to the group response indication information.

In this embodiment of the present disclosure, the execution body STA of the method 400 may be a STA in the STA 111 to the STA 115 shown in FIG. 1, and correspondingly, the AP may be the AP 110 shown in FIG. 1.

When the AP needs to communicate with the multiple STAs, the AP needs to obtain a transmission opportunity. In this embodiment of the present disclosure, the AP sends an RTS frame carrying group response indication information, where the group response indication information is used to instruct the multiple STAs to return CTS frames. That is, the multiple STAs are all target STAs and all need to return CTS frames.

After the AP sends the RTS frame, each of the multiple STAs returns a CTS frame to the AP according to the group response indication information after receiving the RTS frame. When a node within coverage of the STA receives the CTS frame, if the node is not the AP, the node sets an NAV according to the CTS frame, and in this way, the node causes no interference to the STA.

Because a difference between times at which STAs within coverage of a same AP receive an RTS frame is slight, the STAs return CTS frames almost at the same time. As long as a difference between times at which the CTS frames, sent by the STAs, arrive at the AP is within a time length range of a CP, the AP can receive the CTS frames correctly. After receiving the CTS frames that are returned according to the group response indication information by the multiple STAs, the AP successfully obtains a transmission opportunity, so that the AP can communicate with the multiple STAs by using the transmission opportunity. With the transmission opportunity, the AP is also allowed to communicate with a STA that does not return a CTS frame. Because of lack of protection by the CTS frame, a possibility that transmission between the STA and the multiple STAs succeeds may decrease.

According to the channel contention method in this embodiment of the present disclosure, an RTS frame that is sent by an AP and carries group response indication information is received, and a CTS frame is returned to the AP according to the group response indication information, so that data transmission between an AP and multiple STAs can be effectively protected with a relatively small overhead, and system efficiency can be improved.

Optionally, in an embodiment of the present disclosure, the multiple STAs belong to a group in a BSS of the AP, and the group response indication information is a group identifier. In this case, that the STA returns the CTS frame to the AP according to the group response indication information includes determining, by the STA according to the group identifier, that the STA belongs to the group, and returning the CTS frame to the AP.

Optionally, in another embodiment of the present disclosure, the multiple STAs are all STAs in a BSS of the AP, and the group response indication information is a MAC address of the AP or a preset value.

In this embodiment of the present disclosure, optionally, the group response indication information is carried in an RA field of the RTS frame.

When the group response indication information is a group identifier, the group identifier is carried in the RA field, that is, a receiver address is defined as the group identifier. In this case, an address in the RA field is a multicast address, and the RTS frame sent by the AP is a multicast RTS frame. The STA determines, according to the multicast address, that the STA is a target STA, and then, returns a CTS frame.

When the group response indication information is the MAC address of the AP or the preset value, the MAC address of the AP or the preset value is carried in the RA field, that is, a receiver address is defined as the MAC address of the AP or the preset value. In this case, an address in the RA field is a broadcast address, and the RTS frame sent by the AP is a broadcast RTS frame. The STA determines, according to the broadcast address, that the STA is a target STA, and then, returns a CTS frame.

The group response indication information is carried in the RA field, so that a slight modification is made to an existing RTS frame, and backward compatibility can be maintained.

In this embodiment of the present disclosure, optionally, the method 400 further includes receiving updated group response indication information sent by the AP, where the updated group response indication information is obtained after the AP updates the group response indication information when the AP is associated with a new STA and if a MAC address of the new STA is the same as the group response indication information.

For example, if a group identifier or a preset value is used as the group response indication information, when a new STA in the BSS is associated with the AP, the AP needs to check whether a MAC address of the new STA conflicts with a currently defined group identifier or preset value. If there is a conflict, the AP needs to update the group identifier or the preset value and sends an updated value to all the STAs in the BSS.

In this embodiment of the present disclosure, the CTS frame returned by the STA is the same as another CTS frame that is returned according to the group response indication information. That is, CTS physical frames sent by the STAs have completely same content, use completely same preambles, and are sent by using a completely same modulation and coding scheme, so as to ensure that the AP correctly receives the CTS frames.

Optionally, in this embodiment of the present disclosure, before the STA receives the RTS frame sent by the AP, the method 400 further includes acquiring, by the STA, an identifier sequence allocated by the AP, where the identifier sequence of the STA is orthogonal or quasi-orthogonal to an identifier sequence allocated by the AP to another STA in the BSS of the AP; and after the STA returns the CTS frame to the AP according to the group response indication information, the method further 400 includes sending, by the STA, the identifier sequence of the STA to the AP, so that the AP determines, according to the received identifier sequence, the STA returning the CTS frame.

Specifically, the AP allocates the identifier sequence to each STA in advance, and the identifier sequences of the STAs are orthogonal or quasi-orthogonal; after returning a CTS frame, each STA sends the identifier sequence; and the AP performs a correlation operation on the received identifier sequence and identifier sequences of all STAs that should return CTS frames, so as to determine a STA actually returning a CTS frame.

According to the channel contention method in this embodiment of the present disclosure, an RTS frame that is sent by an AP and is used to instruct multiple STAs to return CTS frames is received, so that data transmission between an AP and multiple STAs can be effectively protected with a relatively small overhead, and system efficiency can be improved.

It should be understood that, in the embodiments of the present application, sequence numbers of the foregoing processes do not mean execution sequences. The execution sequences of the processes should be determined according to functions and internal logic of the processes, and should not constitute any limitation on implementation processes of the embodiments of the present disclosure.

The foregoing describes the channel contention method according to the embodiments of the present disclosure in detail with reference to FIG. 1 to FIG. 4, and the following describes an AP and a STA according to the embodiments of the present disclosure with reference to FIG. 5 to FIG. 8.

Figure 5:
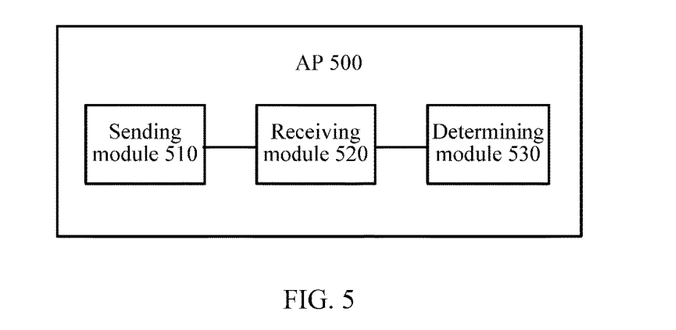
FIG. 5 is a schematic block diagram of an AP according to an embodiment of the present disclosure.

FIG. 5 is a schematic block diagram of an AP 500 according to an embodiment of the present disclosure. As shown in FIG. 5, the AP 500 includes a sending module 510, configured to send an RTS frame, where the RTS frame carries group response indication information, and the group response indication information is used to instruct multiple STAs to return CTS frames, a receiving module 520, configured to receive a CTS frame that is returned according to the group response indication information by a STA among the multiple STAs that receives the RTS frame; and a determining module 530, configured to determine, according to the received CTS frame, that a transmission opportunity is obtained.

According to the AP in this embodiment of the present disclosure, an RTS frame carrying group response indication information is sent, to instruct multiple STAs to return CTS frames, and a CTS frame that is returned according to the group response indication information is received, so that data transmission between an AP and multiple STAs can be effectively protected with a relatively small overhead, and system efficiency can be improved.

Optionally, in an embodiment of the present disclosure, the multiple STAs belong to a group in a BSS of the AP and the group response indication information is a group identifier.

Optionally, in another embodiment of the present disclosure, the multiple STAs are all STAs in a BSS of the AP and the group response indication information is a MAC address of the AP or a preset value.

In this embodiment of the present disclosure, optionally, the group response indication information is carried in an RA field of the RTS frame.

The group response indication information is carried in the RA field, so that a slight modification is made to an existing RTS frame, and backward compatibility can be maintained.

In this embodiment of the present disclosure, optionally, the AP 500 further includes an updating module, configured to: when the AP is associated with a new STA, if a MAC address of the new STA is the same as the group response indication information, update the group response indication information; where the sending module 510 is further configured to send updated group response indication information to all the STAs in the BSS.

In this embodiment of the present disclosure, CTS frames returned by the STAs returning the CTS frames are the same.

In this embodiment of the present disclosure, optionally, the AP 500 further includes an allocating module, configured to allocate an identifier sequence to each STA in the BSS of the AP, where the identifier sequences of the STAs are orthogonal or quasi-orthogonal; where the receiving module 520 is further configured to receive an identifier sequence that is sent after the STA returning the CTS frame returns the CTS frame and the determining module 530 is further configured to perform a correlation operation according to the received identifier sequence and the identifier sequences of the multiple STAs, to determine the STA returning the CTS frame.

The AP 500 according to this embodiment of the present disclosure may correspond to the AP in the channel contention method according to the embodiments of the present disclosure (for example, the AP 100 shown in FIG. 1), and moreover, the foregoing and other operations and/or functions of the modules in the AP 500 are separately for implementing corresponding processes of the methods shown in FIG. 1 to FIG. 4, and for brevity, no further details are described herein.

According to the AP in this embodiment of the present disclosure, multiple STAs are instructed in an RTS frame to return CTS frames, so that data transmission between an AP and multiple STAs can be effectively protected with a relatively small overhead, and system efficiency can be improved.

Figure 6:
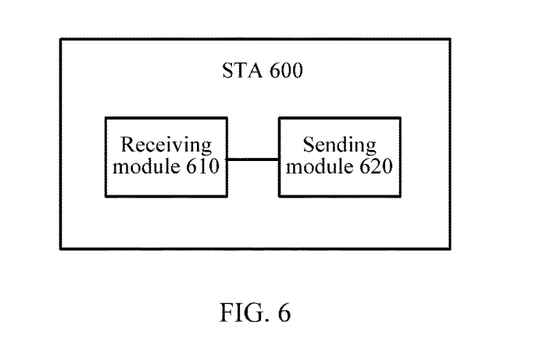
FIG. 6 is a schematic block diagram of a STA according to an embodiment of the present disclosure.

FIG. 6 is a schematic block diagram of a STA 600 according to an embodiment of the present disclosure. As shown in FIG. 6, the STA 600 includes a receiving module 610, configured to receive an RTS frame sent by an AP, where the RTS frame carries group response indication information, and the group response indication information is used to instruct multiple STAs to return CTS frames, and a sending module 620, configured to return a CTS frame to the AP according to the group response indication information.

According to the STA in this embodiment of the present disclosure, an RTS frame that is sent by an AP and carries group response indication information is received, and a CTS frame is returned to the AP according to the group response indication information, so that data transmission between an AP and multiple STAs can be effectively protected with a relatively small overhead, and system efficiency can be improved.

Optionally, in an embodiment of the present disclosure, the multiple STAs belong to a group in a BSS of the AP, and the group response indication information is a group identifier.

The STA 600 further includes a determining module, configured to determine, according to the group identifier, that the STA belongs to the group where the sending module 620 is specifically configured to: when the determining module determines that the STA belongs to the group, return the CTS frame to the AP.

Optionally, in another embodiment of the present disclosure, the multiple STAs are all STAs in a BSS of the AP and the group response indication information is a MAC address of the AP or a preset value.

In this embodiment of the present disclosure, optionally, the group response indication information is carried in an RA field of the RTS frame.

The group response indication information is carried in the RA field, so that a slight modification is made to an existing RTS frame, and backward compatibility can be maintained.

In this embodiment of the present disclosure, optionally, the receiving module 610 is further configured to receive updated group response indication information sent by the AP, where the updated group response indication information is obtained after the AP updates the group response indication information when the AP is associated with a new STA and if a MAC address of the new STA is the same as the group response indication information.

In this embodiment of the present disclosure, the CTS frame returned by the STA is the same as another CTS frame that is returned according to the group response indication information.

In this embodiment of the present disclosure, optionally, the receiving module 610 is further configured to: before receiving the RTS frame sent by the AP, receive an identifier sequence allocated by the AP, where the identifier sequence of the STA is orthogonal or quasi-orthogonal to an identifier sequence allocated by the AP to another STA in the BSS of the AP and the sending module 620 is further configured to: after returning the CTS frame to the AP according to the group response indication information, send the identifier sequence of the STA to the AP, so that the AP determines, according to the received identifier sequence, the STA returning the CTS frame.

The STA 600 according to this embodiment of the present disclosure may correspond to the STA in the channel contention method according to the embodiments of the present disclosure (for example, a STA in the STA 111 to the STA 115 shown in FIG. 1), and moreover, the foregoing and other operations and/or functions of the modules in the STA 600 are separately for implementing corresponding processes of the methods shown in FIG. 1 to FIG. 4, and for brevity, no further details are described herein.

According to the STA in this embodiment of the present disclosure, an RTS frame that is sent by an AP and is used to instruct multiple STAs to return CTS frames is received, so that data transmission between an AP and multiple STAs can be effectively protected with a relatively small overhead, and system efficiency can be improved.

Figure 7:
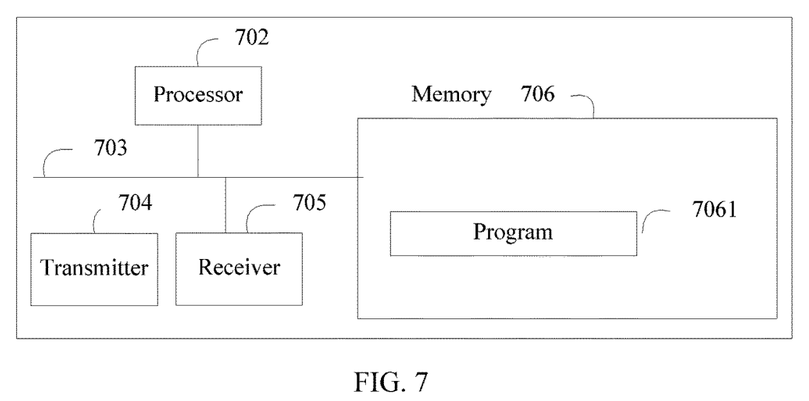
FIG. 7 is a schematic structural diagram of an AP according to an embodiment of the present disclosure.

FIG. 7 shows a structure of an AP according to another embodiment of the present disclosure. The AP includes at least one processor 702 (for example, a CPU), a transmitter 704 and a receiver 705, and may further include another communications interface, a memory 706, and at least one communications bus 703, where the communications bus 703 is configured to implement communication connection between these components. The processor 702 is configured to execute an executable module stored in the memory 706, for example, a computer program. The memory 706 may include a high-speed random access memory (RAM: Random Access Memory), or may include a non-volatile memory (non-volatile memory), for example, at least one magnetic disk storage. Communication with another at least one network element is implemented by using the transmitter 704 and the receiver 705.

In some implementation manners, the memory 706 stores a program 7061, and the processor 702 executes the program 7061.

The transmitter 704 is configured to send an RTS frame, where the RTS frame carries group response indication information, and the group response indication information is used to instruct multiple STAs to return CTS frames.

The receiver 705 is configured to receive a CTS frame that is returned according to the group response indication information by a STA among the multiple STAs that receives the RTS frame.

The processor 702 is configured to determine, according to the received CTS frame, that a transmission opportunity is obtained.

Optionally, the multiple STAs belong to a group in a BSS of the AP and the group response indication information is a group identifier.

Optionally, the multiple STAs are all STAs in a BSS of the AP and the group response indication information is a MAC address of the AP or a preset value.

Optionally, the group response indication information is carried in an RA field of the RTS frame.

Optionally, the processor 702 is further configured to: when the AP is associated with a new STA, if a MAC address of the new STA is the same as the group response indication information, update the group response indication information and the transmitter 704 is further configured to send updated group response indication information to all the STAs in the BSS.

Optionally, CTS frames returned by the STAs returning the CTS frames are the same.

Optionally, the processor 702 is further configured to allocate an identifier sequence to each STA in the BSS of the AP, where the identifier sequences of the STAs are orthogonal or quasi-orthogonal.

The receiver 705 is further configured to receive an identifier sequence that is sent after the STA returning the CTS frame returns the CTS frame.

The processor 702 is further configured to perform a correlation operation according to the received identifier sequence and the identifier sequences of the multiple STAs, to determine the STA returning the CTS frame.

As can be seen from the foregoing technical solution provided in this embodiment of the present disclosure, in this embodiment of the present disclosure, an RTS frame carrying group response indication information is sent, to instruct multiple STAs to return CTS frames, and a CTS frame that is returned according to the group response indication information is received, so that data transmission between an AP and multiple STAs can be effectively protected with a relatively small overhead, and system efficiency can be improved.

Figure 8:
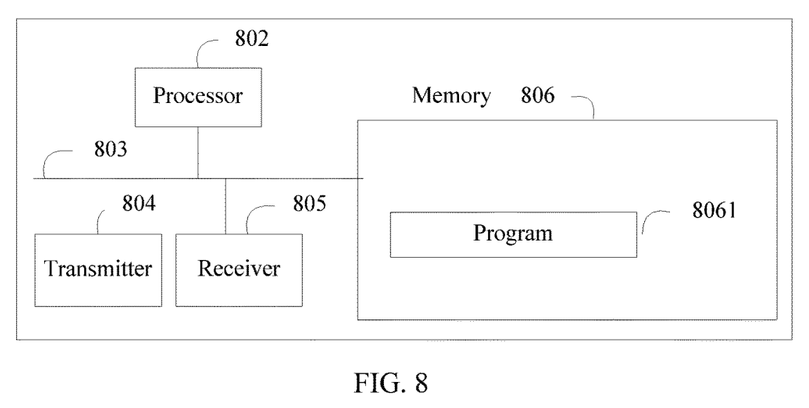
FIG. 8 is a schematic structural diagram of a STA according to an embodiment of the present disclosure.

FIG. 8 shows a structure of a STA according to another embodiment of the present disclosure. The STA includes at least one processor 802 (for example, a CPU), a transmitter 804 and a receiver 805, and may further include another communications interface, a memory 806, and at least one communications bus 803, where the communications bus 803 is configured to implement communication connection between these components. The processor 802 is configured to execute an executable module stored in the memory 806, for example, a computer program. The memory 806 may include a high-speed random access memory (RAM: Random Access Memory), or may include a non-volatile memory (non-volatile memory), for example, at least one magnetic disk storage. Communication connection with another at least one network element is implemented by using the transmitter 804 and the receiver 805.

In some implementation manners, the memory 806 stores a program 8061, and the processor 802 executes the program 8061.

The receiver 805 is configured to receive an RTS frame sent by an AP, where the RTS frame carries group response indication information, and the group response indication information is used to instruct multiple STAs to return CTS frames.

The transmitter 804 is configured to return a CTS frame to the AP according to the group response indication information by using a network interface.

Optionally, the multiple STAs belong to a group in a BSS of the AP. In this embodiment the group response indication information is a group identifier. Also in this embodiment the processor 802 is configured to determine, according to the group identifier, that the STA belongs to the group. In this embodiment the transmitter 804 is specifically configured to when the processor 802 determines that the STA belongs to the group, return the CTS frame to the AP.

Optionally, the multiple STAs are all STAs in a BSS of the AP and the group response indication information is a MAC address of the AP or a preset value.

Optionally, the group response indication information is carried in an RA field of the RTS frame.

Optionally, the receiver 805 is further configured to receive updated group response indication information sent by the AP, where the updated group response indication information is obtained after the AP updates the group response indication information when the AP is associated with a new STA and if a MAC address of the new STA is the same as the group response indication information.

Optionally, the CTS frame returned by the STA is the same as another CTS frame that is returned according to the group response indication information.

Optionally, the receiver 805 is further configured to: before receiving the RTS frame sent by the AP, receive an identifier sequence allocated by the AP, where the identifier sequence of the STA is orthogonal or quasi-orthogonal to an identifier sequence allocated by the AP to another STA in the BSS of the AP and the transmitter 804 is further configured to: after returning the CTS frame to the AP according to the group response indication information, send the identifier sequence of the STA to the AP, so that the AP determines, according to the received identifier sequence, the STA returning the CTS frame.

As can be seen from the foregoing technical solution provided in this embodiment of the present disclosure, in this embodiment of the present disclosure, an RTS frame that is sent by an AP and carries group response indication information is received, and a CTS frame is returned to the AP according to the group response indication information, so that data transmission between an AP and multiple STAs can be effectively protected with a relatively small overhead, and system efficiency can be improved.

It should be understood that, the term "and/or" in this embodiment of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe interchangeability between hardware and software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A channel contention method comprising: allocating, by an access point (AP), an identifier sequence to each of multiple stations (STAs) in a basic service set (BSS) of the AP; wherein the identifier sequences of the STAs are orthogonal or quasi-orthogonal to an identifier sequence allocated by the AP to another STA in a basic service set (BSS) of the AP; sending, by the AP), a request-to-send (RTS) frame that carries group response indication information for instructing the multiple STAs to return clear-to-send (CTS) frames that have a same content and a same preamble, and are sent by the AP using a same modulation and coding scheme; and receiving, by the AP, a CTS frame that is returned according to the group response indication information by a STA among the multiple STAs that receives the RTS frame; receiving, by the AP, an identifier sequence that is sent after the STA returning the CTS frame returns the CTS frame; and performing, by the AP, a correlation operation according to the received identifier sequence and the identifier sequences of the multiple STAs, to determine the STA returning the CTS frame.

2. The method according to claim 1, wherein the multiple STAs belong to a group in a basic service set (BSS) of the AP and the group response indication information is a group identifier.

3. The method according to claim 1, wherein the multiple STAs are all STAs in a basic service set (BSS) of the AP and the group response indication information is a Media Access Control (MAC) address of the AP or a preset value.

4. The method according to claim 1, wherein the group response indication information is carried in a receiver address (RA) field of the RTS frame.

5. A channel contention method comprising:
   acquiring, by a station (STA), an identifier sequence allocated by an access point (AP), wherein the identifier sequence of the STA is orthogonal or quasi-orthogonal to an identifier sequence allocated by the AP to another STA in a basic service set (BSS) of the AP;
   receiving, by the STA, the a request-to-send (RTS) frame sent by the AP, wherein the RTS frame carries group response indication information for instructing multiple STAs to return clear-to-send (CTS) frames that have a same content and a same preamble and are sent by a same modulation and coding scheme;

returning, by the STA, a CTS frame to the AP according to the group response indication information; and sending, by the STA, the identifier sequence of the STA to the AP after the STA sends the CTS frame, so that the AP determines, according to the received identifier sequence, the STA returning the CTS frame.

6. The method according to claim 5, wherein the multiple STAs belong to a group in a basic service set (BSS) of the AP, the group response indication information is a group identifier, and returning the CTS frames to the AP according to the group response indication information comprises: a) determining, by the STA according to the group identifier, that the STA belongs to the group, and returning the CTS frame to the AP.

7. The method according to claim 5, wherein the multiple STAs are all STAs in a basic service set (BSS) of the AP, and the group response indication information is a Media Access Control (MAC) address of the AP or a preset value.

8. The method according to claim 5, wherein the group response indication information is carried in a receiver address (RA) field of the RTS frame.

9. An access point (AP) comprising: a transmitter configured to send a request-to-send (RTS) frame that carries group response indication information for instructing multiple stations (STAs) to return clear-to-send (CTS) frames that have a same content and a same preamble, and are sent by using a same modulation and coding scheme; an4 a receiver configured to receive (a) a CTS frame that is returned according to the group response indication information by a STA among the multiple STAs that receives the RTS frame and (b) an identifier sequence sent after the STA returning the CTS frame returns the CTS frame; and a processor configured to (a) allocate an identifier sequence to each STA in a basic service set (BSS) of the AP, wherein the identifier sequences of the STAs are orthogonal or quasi-orthogonal to an identifier sequence allocated by the AP to another STA in a basic service set (BSS) of the AP, and (b) perform a correlation operation according to the received identifier sequence and the identifier sequences of the multiple STAs to determine the STA returning the CTS frame.

10. The AP according to claim 9, wherein the multiple STAs belong to a group in a basic service set (BSS) of the AP, and the group response indication information is a group identifier.

11. The AP according to claim 9, wherein the multiple STAs are all STAs in a basic service set (BSS) of the AP, and the group response indication information is a Media Access Control (MAC) address of the AP or a preset value.

12. The AP according to claim 9, wherein the group response indication information is carried in a receiver address (RA) field of the RTS frame.

13. A station (STA) comprising:
a receiver configured to (a) receive an identifier sequence allocated by an access point (AP), wherein the identifier sequence of the STA is orthogonal or quasi-orthogonal to the identifier sequence allocated by the AP to another STA in a basic service set (BSS) of the AP and (b) receive a request-to-send (RTS) frame sent by the AP, wherein the RTS frame carries group response indication information for instructing multiple STAs to return clear-to-send (CTS) frames have a same content and a same preamble, and are sent by using a same modulation and coding scheme; and
a transmitter configured to (a) return a CTS frame to the AP according to the group response indication information and (b) send the identifier sequence of the STA to the AP after sending the CTS frame, so that the AP determines, according to the received identifier sequence, the STA returning the CTS frame.

14. The STA according to claim 13, wherein the multiple STAs belong to a group in a basic service set (BSS) of the AP, and the group response indication information is a group identifier, and the STA further comprises a processor configured to determine, according to the group identifier, that the STA belongs to the group; and the transmitter is specifically configured to, when the processor determines that the STA belongs to the group, return the CTS frame to the AP.

15. The STA according to claim 13, wherein the multiple STAs are all STAs in a basic service set (BSS) of the AP, and the group response indication information is a Media Access Control (MAC) address of the AP or a preset value.

16. The STA according to claim 13, wherein the group response indication information is carried in a receiver address (RA) field of the RTS frame.

* * * * *

UNITED STATES PATENT AND TRADEMARK OFFICE
CERTIFICATE OF CORRECTION

PATENT NO. : 10,172,160 B2
APPLICATION NO. : 15/220155
DATED : January 1, 2019
INVENTOR(S) : Wu et al.

Page 1 of 1

It is certified that error appears in the above-identified patent and that said Letters Patent is hereby corrected as shown below:

On the Title Page

Page 2, item (56), Other Publications, Stacey et al., "Proposed TGac Draft Amendment," IEEE 802.11-101/361r0 should read
-- Stacey et al., "Proposed TGac Draft Amendment," IEEE 802.11-10/1361r0 --.

In the Claims

Claim 1, Column 18, Line 40 "and receiving, by the AP," should read
-- receiving, by the AP, --.

Claim 9, Column 19, Line 32 "an4 a receiver configured" should read
-- a receiver configured --.

Signed and Sealed this
Seventeenth Day of December, 2019

Andrei Iancu
*Director of the United States Patent and Trademark Office*